June 26, 1956 R. W. BEACH 2,751,945
ROUTER GUIDE MECHANISM
Filed March 17, 1953
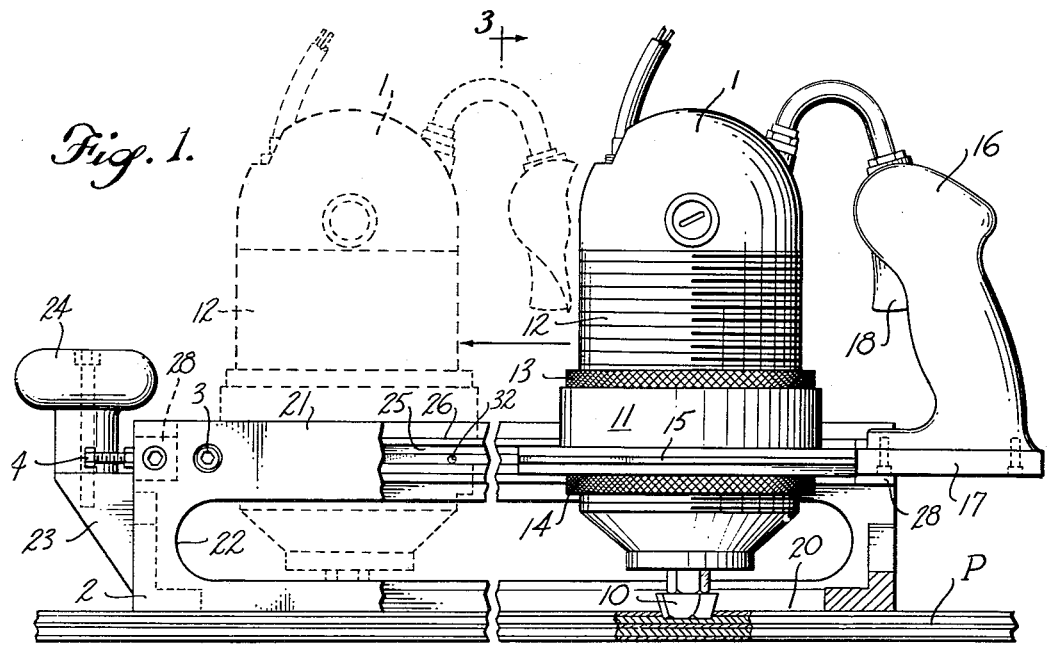
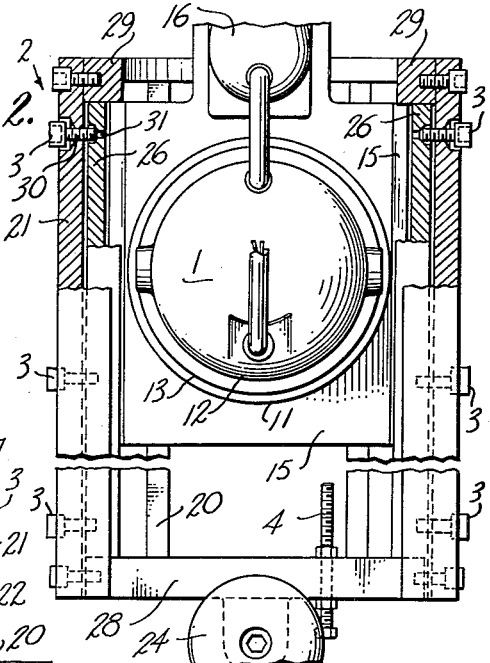
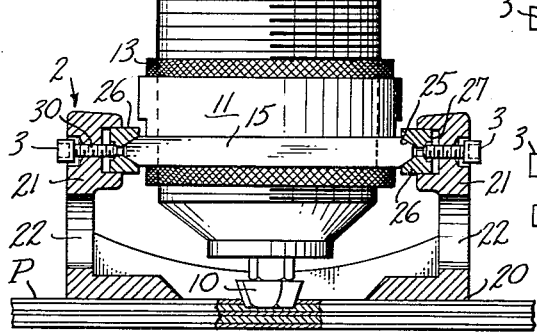
INVENTOR.
ROBERT W. BEACH
BY
Reynolds, Beach & Christensen
ATTORNEYS

2,751,945
ROUTER GUIDE MECHANISM

Robert W. Beach, Seattle, Wash., assignor to American Manufacturing Company, Inc., Tacoma, Wash., a corporation of Washington Application March 17, 1953, Serial No. 342,814

3 Claims. (Cl. 144—136)

The present invention relates to routers particularly useful for removing defects from panels, such as boards or veneer sheets, and is concerned particularly with an arrangement for locating and guiding a router accurately during its movement in removing such a defect.

Routers have been used heretofore for the purpose of removing defects from surfaces of wood panels but some of such routers have not been very stable in use or have tended to slip on the work so that the cut made was not accurate in length or width, or sometimes both. Other types of router mountings have been subject to wear so that in a short time they lost their accuracy, and still others have been difficult to make accurate in the first instance.

A principal object of the present invention is to provide guide mechanism for a router which can be manufactured economically, and yet which will be rugged and stable in supporting the router in all cutting positions. A further object is to provide guide means for such router which can be manufactured inexpensively, yet accurately, and are adjustably mounted so that they can be fitted accurately initially, and in the event wear occurs at any time can be adjusted easily to compensate for any such wear.

To accomplish the foregoing objects a frame to rest stationarily on the panel from which the defect is to be cut carries the guide mechanism, which in turn supports the router for reciprocating movement along a predetermined path. The router includes a motor, a cutter driven by the motor and a mounting for the motor. The guide mechanism interposed between the router and the frame includes spaced parallel centering guide ways carried by the frame and engaged with a guided slide carried by the router. The centering action is accomplished by the guide ways and slide having cooperating wedging surfaces, the slide carried by the guide, for example, having tapered edges fitting complementally flared V-grooved ways.

Additional advantages and features of the preferred construction illustrated in the drawings will be pointed out in the following detailed description.

Figure 1 is a side elevation view of the router and base frame with parts broken away to show structural details.

Figure 2 is a plan view of the router and base frame, having parts broken away.

Figure 3 is a transverse sectional view through the base frame on line 3—3 of Figure 1, and showing the router in elevation.

Figure 4 is a fragmentary sectional view through a ways adjusting element on an enlarged scale.

The router includes a motor 1 which carries directly the router bit 10 and drives it at motor speed. This router bit is of the combined end-cutting and side-cutting type, so that the motor is supported directly in a mounting collar 11 in a position with the rotative axis of the motor end bit disposed perpendicular to the panel P, the surface of which is to be grooved for removing the defect. The motor may be adjusted axially relative to its mounting collar by having threads 12 with which nuts 13 and 14 above and below the mounting collar engage, and which nuts may be moved into tight abutment with the collar to hold the motor firmly to it in the desired adjusted position.

To support and guide the router for linear translation along a path parallel to the surface of the panel P a base frame 2 is provided, which preferably is a casting. This frame has a flat bottom 20 to contact the face of the panel P stably for the double purpose of preventing tilting of the router axis in any direction and to engage the panel surface frictionally to prevent inadvertent sliding of the base frame relative to the panel. To increase the frictional contact between the base frame and panel surface small points may be provided projecting downward from the surface of the base, or the base may be otherwise roughened for this purpose if desired.

The base casting 2 is of generally rectangular shape and has sides 21 projecting upwardly from the bottom, which sides may have large apertures 22 in them to lighten the frame and save material. On one end of the base frame is a bracket 23 carrying a handle 24 which may be gripped by the operator to assist in pressing the base frame against the work and holding it stationary during a defect cutting operation.

The router mounting collar 11 carries a slide plate 15 guided by the base frame 2 in a plane parallel to the surface of the panel P for linear reciprocation. Opposite edges of this plate are double chamfered to form a wedging edge complemental to the flared groove 25 in the guide ways bar 26 carried by each side 21 of the base frame. Preferably such side has a groove 27 extending lengthwise parallel to the surface of the panel P, in which the ways bar is adjustably received. Each ways bar 26 is mounted in its groove 27 for positive adjustment toward the router by setting of regulating screws 3.

In Figure 4 the structure of the regulating screw and its mounting is shown. Each screw 3 has its shank threaded into a complementally threaded hole 30 in the side 21 of the base frame 2, and if this frame is sufficiently thick the outer end of the aperture 30 may be enlarged to receive the head of the screw partially. A tip 31, smaller than the threaded portion of the screw, is formed on it for reception in an aperture 32 extending through the ways bar 26 and having a bearing surface, preferably countersunk, on which the end of the threaded portion of screw 3 seats. The screw 3 thus affords a thrust bearing action on the ways bar.

Several screws 3 are spaced along the length of ways bars 26 at intervals sufficiently close to prevent any appreciable bending of the ways bars. The slide plate 15 may have its opposite edges inserted in the grooves 25 of the ways bars, respectively, while the screws 3 are considerably retracted. The screws along the lengths of the ways bars are then screwed inward until a smooth, uniform sliding fit between the double beveled edges of plate 15 and the ways bars grooves results throughout the entire travel of the router. The regulating screws can be readjusted from time to time to compensate for any wear of the slide surfaces or ways grooves, or to adjust the tightness of the slide in the ways as may be desired by a particular operator.

Across the end of frame 2 adjacent to handle 24 is a tie bar 28 in which a stop screw 4, shown best in Figures 1 and 2, is threaded. This stop screw may be adjusted lengthwise and locked in position corresponding to the length of stroke desired for the router. At the opposite end of the frame blocks 29 are mounted coplanar with the ways bars 26 for engagement by the slide plate 15 to limit its movement away from stop screw 4 which it engages at the opposite end of the router stroke.

A handle 16 may be provided for the purpose of reciprocating the router in its base frame. This handle may be secured to a projection 17 of slide plate 15, as shown in Figure 1.

When the router guide plate 15 has its edges received in the ways grooves 25, the router bit 10 will project beyond the flat bottom of the base casting 2 through a central slot extending longitudinally of the base. By grasping handles 16 and 24 the operator may rock the base about one end corner or the other down into router bit engaged position with the motor energized by the handle trigger switch 18. By holding handle 24 stationary with one hand and pushing or pulling on handle 16 with the other hand, depending upon the location of the router in the base when the cutting operation is begun, the router may be slid relative to the base so that the router bit cuts a straight groove of predetermined length and uniform depth in the upper surface of the panel P. When the cut has been completed, the base is again rocked to lift the bit from contact with the panel. While the cut may be initiated by the router at either end of its path of travel and terminated at the opposite end, the router base should be rocked about the end corner remote from the location of the router when the router bit either is engaged initially with the surface of the panel, or is lifted out of contact with such surface.

I claim as my invention:

1. In router mechanism incorporating a router tool, the improvement comprising base means adapted to rest on the work for supporting the router mechanism, router tool supporting means operable to support the router tool for engagement with the work beneath said base means, and guide means operable to guide said router tool supporting means for movement of the router tool relative to said base means in a path generally parallel to the surface of the work for cutting a groove therein and including two parallel pairs of interfitting wedging rib and groove members elongated parallel to such path of movement, one member of each such pair being supported by said router tool supporting means along opposite sides thereof, respectively, and the other member of each such pair being supported by opposite sides, respectively, of said base means at opposite sides of said tool supporting means, and a plurality of adjusting means spaced lengthwise of said wedging rib and groove members, interengaged between at least one of said members and its supporting means to hold the opposite ends of such member in any of various positions relative to its paired member for arranging said rib and groove members in precise parallelism and snugly interfitted.

2. In router mechanism incorporating a router tool, the improvement comprising base means adapted to rest on the work for supporting the router mechanism, router tool supporting means operable to support the router tool for engagement with the work beneath said base means, and guide means operable to guide said router tool supporting means for movement of the router tool relative to said base means in a path generally parallel to the surface of the work for cutting a groove therein and including two parallel pairs of interfitting wedging rib and groove members elongated parallel to such path of movement, one member of each such pair being supported by said router tool supporting means along opposite sides thereof, respectively, and the other member of each such pair being supported by opposite sides, respectively, of said base means at opposite sides of said tool supporting means, and a plurality of thrust means spaced lengthwise of said wedging rib and groove members, interengaged between said base means and each of said members supported thereby to move the opposite ends of such members in varying degrees relative to their respective paired members for arranging said rib and groove members in precise parallelism and snugly interfitted.

3. In router mechanism incorporating a router tool, the improvement comprising base means adapted to rest on the work for supporting the router mechanism, router tool supporting means operable to support the router tool for engagement with the work beneath said base means, and guide means operable to guide said router tool supporting means for movement of the router tool relative to said base means in a path generally parallel to the surface of the work for cutting a groove therein and including two parallel pairs of interfitting wedging rib and groove members elongated parallel to such path of movement, one member of each such pair being supported by said router tool supporting means along opposite sides thereof, respectively, and the other member of each such pair being supported by opposite sides, respectively, of said base means at opposite sides of said tool supporting means, and several screws distributed along each of such members supported by said base means and threaded in said base means to hold such members in any of various positions relative to their respective paired members for arranging said rib and groove members straight, in precise parallelism and snugly interfitted.

References Cited in the file of this patent

UNITED STATES PATENTS

| | | |
|---|---|---|
| 1,299,828 | Fulton | Apr. 8, 1919 |
| 1,345,731 | Ambrose | July 6, 1920 |
| 1,653,030 | Zeh | Dec. 20, 1927 |
| 2,340,450 | Bouschor | Feb. 1, 1944 |
| 2,504,347 | O'Donnell | Apr. 18, 1950 |
| 2,558,111 | Tiemann | June 26, 1951 |
| 2,591,002 | Pedron | Apr. 1, 1952 |
| 2,630,151 | Turnbull | Mar. 3, 1953 |